United States Patent [19]

Prudhon et al.

[11] 4,257,339

[45] Mar. 24, 1981

[54] PROCESS FOR TREATING SUBSTANCES IN DIFFERENT PHASES, SUCH AS THE TREATMENT OF SUBSTANCES IN LIQUID, SEMI-LIQUID OR PASTE FORM, BY ANOTHER NOTABLY GASEOUS PHASE

[75] Inventors: François Prudhon, Versailles; Augustin Scicluna, Aubervilliers, both of France

[73] Assignee: Rhone-Poulenc Industries, Paris, France

[21] Appl. No.: 963,768

[22] Filed: Nov. 27, 1978

Related U.S. Application Data

[63] Continuation-in-part of Ser. No. 916,477, Jun. 19, 1977, abandoned, which is a continuation of Ser. No. 770,802, Feb. 22, 1977, abandoned, which is a continuation of Ser. No. 479,774, Jun. 17, 1974, abandoned.

[30] Foreign Application Priority Data

Jun. 20, 1974 [FR] France .................. 74 22620

[51] Int. Cl.$^3$ .............................. F23G 5/00
[52] U.S. Cl. .................. 110/346; 110/238; 431/8; 261/79 A
[58] Field of Search ............... 110/238, 346; 431/4, 431/8, 9, 10, 173, 158, 352, 353; 239/403, 405; 55/235–238, 257 R; 261/79 A

[56] References Cited

U.S. PATENT DOCUMENTS

| | | | |
|---|---|---|---|
| 3,998,581 | 12/1976 | Hemingway et al. | 431/158 |
| 4,120,640 | 10/1978 | Martin | 431/173 X |
| 4,124,353 | 11/1978 | Prudhon et al. | 431/8 |

Primary Examiner—Edward G. Favors
Attorney, Agent, or Firm—McDougall, Hersh & Scott

[57] ABSTRACT

Apparatus and process for treatment of materials in different phases, one of which is in a fluid phase and another of which is in a gaseous phase, wherein the material in fluid phase is introduced as a stream within the axis of the gaseous phase in helicoidal flow for subsequent passage through a confined zone whereat a substance to be treated is introduced at the level of the smallest section of the confined zone.

7 Claims, 3 Drawing Figures

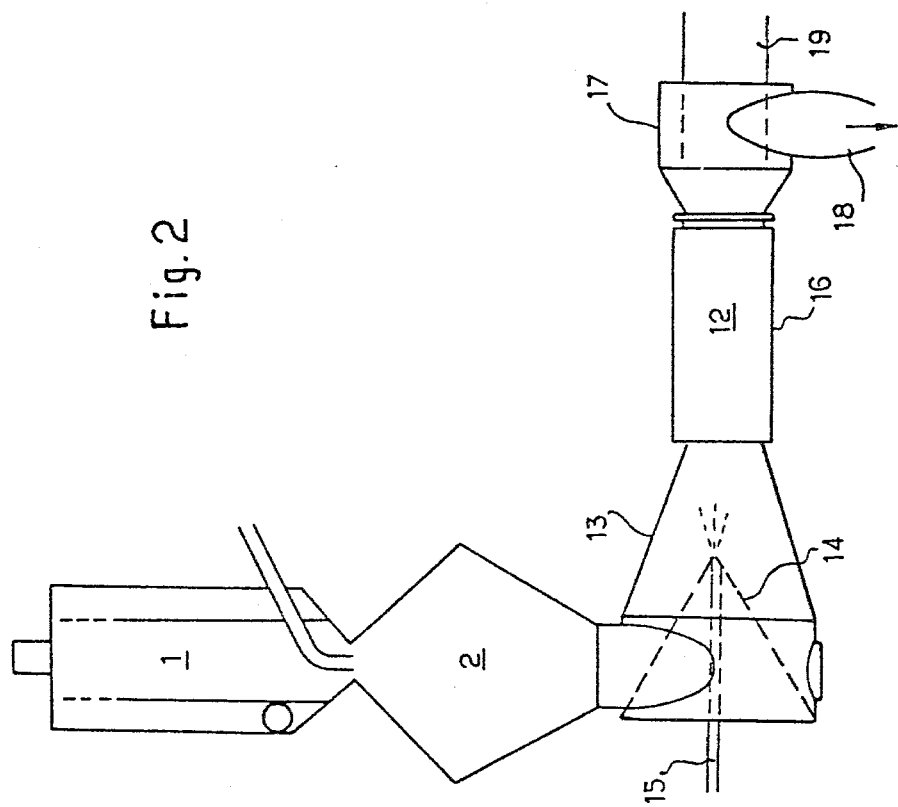
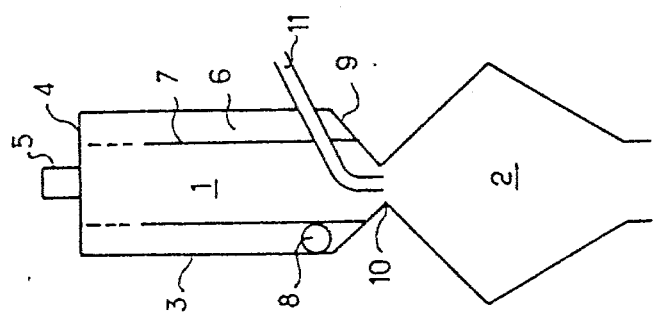

PROCESS FOR TREATING SUBSTANCES IN DIFFERENT PHASES, SUCH AS THE TREATMENT OF SUBSTANCES IN LIQUID, SEMI-LIQUID OR PASTE FORM, BY ANOTHER NOTABLY GASEOUS PHASE

This is a continuation-in-part of our co-pending application Ser. No. 916,477, filed June 19, 1977, abandoned, as a continuation of application Ser. No. 770,802, filed Feb. 22, 1977 (now abandoned), as a continuation of Ser. No. 479,774, filed June 17, 1974 (now abandoned).

The present invention pertains to a process for treating substances in liquid, semi-liquid or paste form by another, notably gaseous phase.

It especially applies to the treatment of materials in liquid form with or without solid materials in suspension therein, by means of a gas at high temperature.

This is a typical problem, for example, in the case of treating waste water capable of yielding oxidation dried materials.

Many solutions have already been proposed to solve this problem.

Thus, in French Pat. No. 2,075,354, it was proposed to eliminate liquid industrial wastes by conversion to solid wastes by treatment with a silicate solution and a solidification agent of said silicate.

It has been found that this is not a simple solution to the problem because it calls for the addition of compounds to the waste water, involves several steps and leads to a compound which itself should even be eliminated, which, in the above-indicated case, compels solid residues resistant to water dilution to be obtained so that they may be incorporated into certain soils for enrichment.

A totally different solution is advocated in French Pat. No. 2,320,268. This consists of putting said water, at pH's below 7 and at a temperature of between 20° and 200° C., into contact with pure technical oxygen, at pressure comprised between normal pressure and 20 bars, until the sulfur is converted to thiosulfates, then transforming these thiosulfates into sulfates by the action of technical oxygen at a pH from 0 to 5, or from 0 to 8 for waste water containing only sulfates, at temperatures of between 20° to 200° C., at pressure up to 20 bars, and possibly in the presence of catalysts.

It can be seen that this solution is equally time consuming and also calls for several operations involving physical and chemical processes.

More recently, in French application No. 77,3154 filed Oct. 20, 1977, it was proposed to subject these waste waters simultaneously to pulverization and an oxidizing heat treatment and then to separate the solid residues from the volatile compounds in a simple manner.

It was proposed to implement the process in French Pat. No. 2,257,326, corresponding to our co-pending application Ser. No. 916,477, filed June 19, 1978, as a continuation of application Ser. No. 770,802, filed Apr. 19, 1977 (now abandoned), which was filed as a continuation of application Ser. No. 479,774, filed June 17, 1974, now abandoned, which co-pending application is incorporated herein by reference, and according to which substances in different phases are put into contact with each other. In this process, at least one phase is used to form an axially symmetrical helical flow and at least one phase is introduced according to the symmetry axis of said helical flow until, in the reduced pressure zone of said helical flow, the momentum of the volume elements of the axial phase is such that said helical flow simultaneously causes the disintegration, dispersion and taking over of the axial phase and its eventual treatment by the helical flow.

However, the treatment conditions are very exacting, requiring temperatures of approximately 900° to 1200° C.

This involves contact heads which are able to withstand similar temperatures and resist the action of products treated at these temperatures as well as in an oxidizing medium, which is not the case for typical atomization heads.

It is for this reason that, in French application No. 78,07248 filed Mar. 14, 1978, in the name of the applicants, a new device was proposed to implement the process in French Pat. No. 2,257,326, said device consisting of an assembly to form the helical flow composed of an element of rotation defining an annulus, in which the gaseous phase is tangentially introduced, limited by a divider element with axial symmetry conferring axial symmetry on the thusly formed helicoidal flow, the above-mentioned divider being mechanically independent of the rigid assembly for rotation.

In this way, the assembly can be cooled satisfactorily and the gaseous phase can be brought to a very high temperature.

Unfortunately, production of such a device is not always easy and we have found that excellent results could be obtained more simply with the process of this invention.

The present invention pertains to a process for treating substances in various phases, such as the treatment of semi-liquid or paste substances by means of another phase, notably gaseous, possibly with entrained solid materials; process according to which, in zone one, called reaction zone, a reaction between the fluid currents is assured in a zone away from any wall, by introducing a gaseous phase in symmetrical helicoidal flow defining a cylindrical axial zone in which is axially introduced a phase composed of substances capable of reacting with the substances constituting the helicoidal current, and that said substances are brought to a temperature at which a reaction begins; characterized by the fact that, after meeting with the axial phase, the helicoidal current is forced to pass through a confined space and that at least one other phase to be treated is introduced according to the symmetry axis of revolution of said helicoidal flow in the reduced pressure zone, the momentum of the volume of materials in helicoidal flow, at the level of passage into the confined space being equal to at least 100 times that of the phase in axial flow.

The gaseous phase is advantageously introduced under low pressure, less than one bar, and preferably between 0.2 and 0.5 bar above the pressure prevalent downstream in the contact zone; the velocity is generally between 10 and 100 m/s, and preferably between 30 and 60 m/s (meters/sec).

The injection rate of the substance reacting with the gaseous phase can reach velocities of approximately 100 and 150 m/sec.

According to one of the designs of the present invention, the reaction zone is formed of a combustion zone. The axial phase entering this reaction zone is composed of a carbonaceous phase like fuel, for example, or any other combustible material which is injected through the inlet of said zone and along the symmetry axis of the helicoidal current.

For this to be achieved, a classical pulverization process, such as pressure pulverization or spin pulverization can be used, but the process in French Pat. No. 2,257,326 can also be implemented by the formation of drops by means of transfer of momentum to the materials in axial flow upon engagement with the volume of material at much higher momentum in helicoidal flow, as defined in our co-pending application Ser. No. 916,477, supra.

The helicoidal phase is composed of a combustive gaseous phase, generally ambient air, but it is of course understood that this type of implementation is in no way limited.

The substance to be treated is introduced in liquid, semi-liquid or paste form, axially, at the end of the combustion zone. The introduction rate is slow, approximately 0.03 to 10 m/sec.

In this way, the symmetric helicoidal flow disintegrates the liquid jet by the described transfer of momentum.

In this way, it is possible to treat liquid substances easily at high temperatures because it prevents the products from touching the walls and bringing these walls to the treatment temperature.

In the present invention, the gases at the outlet of the combustion zone can be brought, without difficulty, to temperatures of between 900° to 1200° C., and this furthermore allows the material to be treated to be introduced at ambient temperature.

Moreover, a particular application of the present invention pertains to the treatment of waste water.

It is known that in the latter case, it is advisable to evaporate a large quantity of liquid and at the same time carry out an oxidizing thermal treatment, and simultaneously separate the solid residues thusly obtained from the volatile compounds.

This process is especially applicable in the case of waste water with dry material in amounts up to 20–30%, some of these dry materials being capable of oxidation, as in the case of sulfides and polysulfides which are then eliminated as sulfates. In this case, the gases at the outlet of the combustion zone are advantageously brought to temperatures of between 900° and 1200° C., and of between 350° and 500° C. in the treatment zone.

Cooling can still be produced at the outlet of the treatment zone.

Also, there can be a simple, static rotation zone at the outlet of the treatment zone.

In this way, a particle separation system is produced.

This system can furthermore be equipped with injection means for a liquid and/or gaseous phase with which it is possible either to introduce a binder or to produce a solidifying or soaking effect. Or one or more recyclings can be produced as well as the simultaneous introduction of several phases, notably in co-pulverization form.

Obviously, the present invention is not limited only to the problem of pollution caused by waste water.

In particular, it can be applied wherever a high temperature is required, i.e., notably:

rapid evaporation of volatilizable compounds and especially product drying in suspension or in aqueous emulsion, or in the concentration of solutions. This is particularly advantageous in the case of
mineral acid concentrations, such as phosphoric acid or sulfuric acid.
mixing operation, and in general impregnation of solids by liquids.
particle solidification with transformation into small balls, or treatment of grain surfaces with possibly a change in the superficial structure of the grains.
possibility of carrying out reactions, such as chlorinations or oxidations, in the middle of a produced homogeneous mixture.

It is also possible to treat heat-sensitive materials, such as protein base materials. By using the process in the invention, one can work with a high temperature gradient, therefore under conditions permitting good heat efficiency, while preventing degradation of materials treated, as in the process described in application No. 77 20287 filed July 1, 1977, in the name of the applicant.

The present invention can be implemented by a hot gas generating device, such as the one described in French Pat. No. 2,276,086, U.S. application Ser. No. 770,053, supra, and consisting of an outer casing with surface of revolution, defining a reaction chamber, closed at one end and with a confined passage at the other, said chamber also with a perforated inner wall, defining with the outer casing an annulus, and communication with at least one tangential supply pipe of a gaseous phase, said chamber also having axial injection means for introducing part of the substances to be treated through the closed end of the casing; and characterized by the fact that the reaction chamber is extended beyond the confined passage by a contact space of the largest section into which, opens up perceptibly at the level of the smallest section of the confined passage, a co-axial injection means for at least one substance to be treated.

The inner wall is perforated lengthwise dependent upon calorie output and gas temperatures.

This perforated wall has holes which are usually circular and which must be "thin walled" at least on the side of the closed end of the apparatus, i.e., the ratio of the diameter of the holes to the wall thickness must be more than 5, the minimum wall thickness being limited only by mechanical requirements. There are at least 6 of them and they are distributed on at least one circle, but preferably on several axially spaced circles of the cylindrical wall. Most of the holes are arranged on the upstream side of the apparatus to help mix the substances to be put into contact and correlatively to ensure preheating of part of these substances, while protecting the inner walls from the heat effects of the reaction. The total surface-area of the holes possibly located on the downstream side can be very small, from 1/10 to 1/100 of the total surface-area of the holes.

If $D_1$ is the average internal diameter of the external casing and $D_2$ that of the perforated wall, half $D_1 - D_2$ is preferably from 1 to 10 cm according to the flow rate of the helical stream. The diameter $D_2$ is preferably determined as a function of the total amount of heat liberated in the reaction and is from 0.4 to $0.5\sqrt{k}$ mm, k being the number of kilocalories liberated per hour when the combustible substance is burnt or in general by the reaction brought about. $D_2$ should not be less than 500 mm in cases where a viscous reagent, e.g., a heavy fuel, is introduced in the straight stream, and this reagent should preferably be dispersed finely and homogeneously.

The dimensions of the means for supplying the straight axial stream are immaterial. These means are generally in the form of a pipe, at least outside the apparatus, and their function is either to atomize a liquid thoroughly or to let in a gas without any appreciable drop in pressure. They lend themselves to a great many variations. For example, when the combustible substance is liquid, one can advantageously use a nozzle described in applicant's co-pending application Ser. No. 916,477, supra, and entitled "Process for Contacting Substances Which Occur in Different Phases" (thereby obviating the need to exert pressure on the combustible substance). Alternatively one can use a simple pipe with a frustoconical outlet and with tubing welded to it outside the apparatus to admit the atomizing gas. The only additional precaution which has to be taken is to avoid using an arrangement which would give a very diverging flow (an angle over 90°) in cases where liquid is introduced.

The gaseous current subsequently put into rotation is brought in through a tangential inlet pipe. The conditions for the section of this inlet are above all dependent upon construction requirements and the concern over not having this means cause excessive pressure losses. As previously stated, a relative pressure of 0.2 bar is usually sufficient. The opening connecting this inlet and the annular jacket is preferably close to the downstream end of this reaction chamber.

The combustible substance is ignited by a conventional means, such as a spark plug, with a spark flashing between its electrodes. The plug may be mounted on a retractable device comprising e.g. a metal bellows. The spark is produced in a region where the combustible substance and the combustion-supporting substance are in contact, then the lighting means can be withdrawn to the level of the perforated wall. It is obviously also possible to ignite the mixture or to initiate the reaction with a flame.

Due to the above-mentioned advantage concerning the temperature of the walls, it is possible to make the apparatus of ordinary steel. There is no point in using stainless steel or other corrosion-resistant metals except when the presence of any oxide dust has to be avoided. It is quite unnecessary to provide refractories.

Fireproofing is useless.

The fuel can be a gas such as methane or propane for example, or another light hydrocarbon, liquid residues to be destroyed by combustion with possibly tar or soot in suspension, or a solid body at ambient temperature and melted before being injected, sulfur for example. Other bodies of every diverse natures can also be injected.

Different types of combustion chambers can also be used.

In particular, a torroid annulus equipped with a detachable mechanically independent divider or perforated casing as well as a cylindrical casing and truncated and perforated casing with a downstream tangential inlet and perforations located upstream can be used.

The contact part is identical to the one described in French patent application No. 77-22184, supra, with the minor difference that the swirling chamber movement used is that of the reaction chamber.

The momentum peculiar to the helicoidal flow as compared to that of the liquids in axial flow must be high, in a ratio of at least 100 and preferably between 1000 and 10,000 times. Under these conditions, the movement proper of the gases is then imposed in its direction and intensity to the liquid droplets isolated from each other in the convergence zone of the two currents. The velocity of the liquids is furthermore reduced close to the minimum allowing for their continuous flow and under these conditions, the velocity of the gases can remain rather low so as not to require strong pressure.

The ratio of the liquid and gas masses is obviously chosen as a function of several factors, for example, the temperature of these fluids and of the final operation to be carried out, for example, vaporization of the liquid.

The velocities and consequently the momentum at the level of the confined passage are calculated simply according to the fluid input flow rates and the section of this passage, pressure having little to do with it. The axial current is considered rectilinear and of a section equal to that of the inside of its pipe, whether it emerges or not from the confined passage.

The paths imposed by the gases at the outlet of the constricted zone form one of the two families of generating lines of a "one sheet hyperboloïd", or more specifically, a laminated whole of several hyperboloïds. These generating lines constitute helicoidal currents and lean on a family of circles, or a ring (said "gorge circle" of the hyperboloïd) of small width located downstream near of the confined passage before spreading out in divergent directions. This ring surrounds a reduced pressure zone the effect of which manifests itself upstream on the liquid constituting the rectilinear current and downstream on the gases by having a fraction of these mixed fluids recycled. The liquids are fractioned into a multitude of droplets, each one taken over by a certain volume of gas and subjected to movement creating a centrifugal effect; this improves contact with the vector gas and when combustion takes place, it ensures the ignition and stability of the flame.

The ratio of the gas flow rate on the liquid flow rate may vary in large proportions; an increase of this ratio decreases the size of the droplets formed.

The process of putting substances in different physical states in contact with each other can thus be applied, by means of the device described, to different common operations especially in the chemical and food industries.

In these operations, the current subjected to the swirling movement is generally a gas or a vapor possibly transporting in suspension solids or liquids to be put in contact with substances introduced axially. A pressure of a few hundred grams per square centimeter (from 200 and 500 g/cm2) above the pressure prevalent in the part of the equipment located downstream suffices to ensure good operation of the device. The swirling movement caused by the current creates, as indicated, a slight reduction in pressure in its axial portion, so that a fluid flow can occur in the inner tubular casing without it being necessary to exert pressure on this fluid.

The contact device can be very simply composed of a bicone or truncated cone.

Then the phase or phases to be treated can advantageously be introduced at the level of the confined passage at a distance from the circle of the smallest section comprised in the interval of more or less one radius with respect to the plane of this circle.

Advantageously, the outside diameter of the supply pipe is at least equal to $\frac{1}{4}$ the diameter of this circle, and preferably equal to at least $\frac{2}{3}$ of this diameter.

In order not to disturb the reaction occurring in the first chamber, the substance (or substances) to be treated is fed in simply through a tubular elbow, but other devices such as an annular injector located perceptibly in the plane of the confined passage can be used.

Finally, cooling zones can be supplied either at the level of the contact zone as in French application No. 78 10500 filed Apr. 10, 1978, in the name of the applicant and according to which cooling of the phases is caused at the periphery of the contact zone, or heat treatment more downstream as in French application No. 77 20287 of July 1, 1977, according to which, at the outlet of the flash treatment, the product to be treated undergoes a sudden change of temperature, this treatment being particularly applicable to heat-sensitive materials. In this case, the gases at the outlet of the reaction zone are brought to a temperature of between 200° and 700° C. and the resulting medium at the outlet of the contact zone undergoes a cooling treatment at a temperature of between prefeurentially 20° and 120° C.

The present invention will be more easily understood with reference to the following drawings and examples given only by way of illustration and not by way of limitation, in which:

FIG. 1 represents a device according to the invention corresponding to a general treatment of a substance by a gaseous phase.

FIG. 2 illustrates a more particular case where, at the outlet of the contact zone, there is a post treatment device, notably an anti-dusting system for the device.

Figure 3:
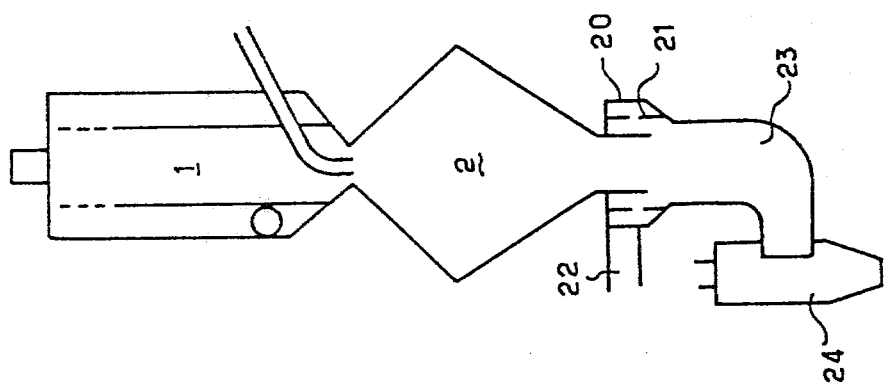
FIG. 3 illustrates a more special case where there is a cooling device.

The device according to FIG. 1 consists of combustion chamber 1 and contact chamber 2.

Chamber 1 consists of casing 3 closed on top by plate 4 in which there is a space provided for mounting pulverization device 5.

The combustion chamber has annulus 6 defined on the inside by cylinder 7 having perforations or holes through its upstream portion.

A gaseous phase is introduced tangentially through inlet opening 8 into annulus 6.

The downstream end of the casing 3 is formed with walls 9 that converge to a confined passage 10, in which, along the rotation axis of chamber 1, elbow pipe 11 exits perceptibly at the level of the section of the confined passage.

Contact chamber 2 is composed of a bicone, its upstream divergent-shaped part extending the converging end portion of chamber 1.

The device in FIG. 2 has the same combustion chamber 1 and the same contact chamber 2 as in Example 1, the difference being that anti-dusting device 12 has been placed at the outlet of bicone 2. This device consists of gasing 13 in which a receiving cone 14 is arranged just beneath bicone 2, and possibly liquid supply pipe 15, the frustum of cone 13 is itself extended by cylinder 16 which makes it possible to maintain rotary movement and which leads the products to centrifugal separator 17.

The solid product leaves in 18 and the gas in 19.

The device in FIG. 3 illustrates another design particularly suited to heat-sensitive materials.

This device is the same as the one in FIG. 1, except that at the outlet of bicone 2, there is a cooling system consisting of a head having perforated wall 21 and tangential pipe 22, port 23 and cyclone 24.

The present invention is, of course, not limited to the designs illustrated; contact chambers which are not biconical or which have an intermediate cylindrical part can also be used.

The following example was carried out with the device in FIG. 2.

A waste water, containing by weight 20% NaCl, 3 to 4% Na sulfate and approximately 5% organic materials comprising polysulfides is treated.

In the device used, chamber 1 has an overall height equal to 193 mm, with a convergent portion of 43 mm.

The diameter of casing 3 is 120 mm, the diameter of perforated wall 7 is 82 mm. The diameter of the confined passage is 18 mm, the inner diameter of pipe 11 at the level of the confined passage is 12 mm, which gives a ratio of ⅔ with respect to that of the diameter of the section in 10; finally, the inner diameter of tube section 11 is 4 mm.

The angle at the top of the upper cone of the bicone is 90°.

The air flow rate, supplying the combustion chamber through tube 8, is 60 Nm3/h, with a pressure of 0.4 bar. The fuel injected in 5 consists of propane.

In this example, the propane injection is controlled so as to obtain a temperature of approximately 1000° C. at the level of the confined passage, and the delivery of water to be treated is controlled so as to maintain a temperature of approximately 500° C. at the outlet of the bicone.

For 30 kg of treated water, the solid phase is composed of 3 kg NaCl and 3 kg sodium sulfate.

In particular, it is observed that the gaseous phase hasn't any fines and is composed, in addition to the combustion gases, essentially of water vapor containing only traces of $SO_2$.

This example therefore illustrates the advantage of the present invention with which it is possible to carry out either the treatment of heat-sensitive materials with good heat efficiency and without thermal degradation or the treatments of pollutant materials, for example, at high temperatures.

As previously stated, this example is not limiting; the same type of device can be used for the concentration of acids or the treatment of products such as gypsum. During the operation, a binder can be introduced, or other products by copulverization, or recycling of certain products may be carried out.

We claim:

1. Process for treating substances in liquid, semi-liquid or paste or solids phase form by means of another, preferably gaseous phase, with or without entrained solid materials; process according to which in zone one called reaction zone, a reaction is ensured between fluid currents in a zone away from any wall, by introducing a gaseous phase in symmetrical helicoidal flow defining a cylindrical axial zone, introducing into said axial zone a phase consisting of substances capable of reacting with the substances constituting the helicoidal current, and that said substances are brought to a temperature at which a reaction begins; characterized by causing the helicoidal current, after meeting with the axial phase, to pass through a confined space and that at least one other phase to be treated is introduced into a treatment zone along the axis of revolution of the consequently formed swirling flow, the momentum of the volume elements of said swirling flow at the level of passage in the confined space being equal to at least 100 times that of the momentum of the axial phase.

2. Process according to claim 1, characterized by the fact that combustion is caused to take place in the reaction zone.

3. Process according to either claim 1 or 2, characterized by the fact that the substances capable of reacting in the reaction zone are introduced as droplets formed by the transfer of momentum from the swirling flow having increased momentum.

4. Process according to either of claims 1 or 3, characterized by the fact that the gaseous phase is introduced under pressure between 0.2 and 0.5 bar, at a velocity of 10 to 100 m/s, that the substance reacting with the gaseous phase is introduced at a velocity of less than 150 m/sec. and that the liquid, semi-liquid or paste phase to be treated is introduced at a velocity between 0.03 and 10 m/sec.

5. The process as claimed in claim 4, in which the gaseous phase is introduced at a velocity within the range of 30–60 m/sec.

6. Process according to claim 1, which comprises treating waste water by bringing the gases at the reaction zone outlet to a temperature of between 900° and 1200° C., and at the treatment zone outlet to a temperature of between 350° and 500° C.

7. Process according to claim 1, characterized by the fact of treating heat-sensitive materials by bringing the gases at the reaction zone outlet to a temperature of between 200° and 700° C. and by subjecting the resulting medium at the treatment zone outlet to a temperature of between 20° and 120° C.

* * * * *